(12) United States Patent
Dahlbäck et al.

(10) Patent No.: US 10,871,212 B2
(45) Date of Patent: Dec. 22, 2020

(54) GEARBOX FOR VEHICLES

(71) Applicant: Scania CV AB, Södertälje (SE)

(72) Inventors: Mårten Dahlbäck, Lidingö (SE); Per Arnelöf, Vendelsö (SE); Jörgen Forsberg, Mariefred (SE); Dieter Slapak, Södertälje (SE)

(73) Assignee: SCANIA CV AB

( * ) Notice: Subject to any disclaimer, the term of this patent is extended or adjusted under 35 U.S.C. 154(b) by 0 days.

(21) Appl. No.: 16/481,907

(22) PCT Filed: Jan. 31, 2018

(86) PCT No.: PCT/SE2018/050069
§ 371 (c)(1),
(2) Date: Jul. 30, 2019

(87) PCT Pub. No.: WO2018/147781
PCT Pub. Date: Aug. 16, 2018

(65) Prior Publication Data
US 2020/0040973 A1 Feb. 6, 2020

(30) Foreign Application Priority Data
Feb. 8, 2017 (SE) ...................... 1750109

(51) Int. Cl.
*F16H 37/04* (2006.01)
*F16H 3/091* (2006.01)
*F16H 3/44* (2006.01)

(52) U.S. Cl.
CPC ........... *F16H 37/046* (2013.01); *F16H 3/091* (2013.01); *F16H 3/44* (2013.01);
(Continued)

(58) Field of Classification Search
None
See application file for complete search history.

(56) References Cited

U.S. PATENT DOCUMENTS

| 6,196,944 B1 | 3/2001 | Schmitz | .................. 475/303 |
| 2004/0040397 A1 | 3/2004 | Razzacki | .................. 74/335 |

(Continued)

FOREIGN PATENT DOCUMENTS

| DE | 10 2014 200 689 A1 | 7/2015 |
| EP | 0 601 645 A1 | 6/1994 |

(Continued)

OTHER PUBLICATIONS

International Search Report dated Mar. 27, 2018 in corresponding PCT International Application No. PCT/SE2018/050069.

(Continued)

*Primary Examiner* — Justin Holmes
(74) *Attorney, Agent, or Firm* — Ostrolenk Faber LLP

(57) ABSTRACT

A gearbox for vehicles that includes a split gearbox, a main gearbox and a range gearbox, which is shiftable into a low range gear position and a high range gear position. The range gearbox includes a planetary gear with a ring gear wheel, a sun gear wheel and a planet carrier, on which at least one planet gear wheel is rotatably mounted. A gearbox housing surrounds the planetary gear. A first axially movable coupling sleeve engages the planet carrier with the gearbox housing. A second axially movable coupling sleeve engages the ring gear wheel with an output shaft to shift into a reverse gear. A crawler gear in the main gearbox is arranged to transfer torque through the gearbox when the range gearbox is shifted into the reverse gear.

13 Claims, 5 Drawing Sheets

(52) U.S. Cl.
CPC ............... *F16H 2037/049* (2013.01); *F16H 2200/0026* (2013.01); *F16H 2702/02* (2013.01)

(56) References Cited

U.S. PATENT DOCUMENTS

| | | | | |
|---|---|---|---|---|
| 2005/0101436 | A1* | 5/2005 | Funato | F16H 47/04 477/107 |
| 2008/0032846 | A1 | 2/2008 | Heinzelmann | 475/207 |
| 2008/0134834 | A1 | 6/2008 | Gitt et al. | 74/745 |
| 2008/0245167 | A1* | 10/2008 | Gitt | F16H 3/006 74/331 |
| 2009/0095101 | A1* | 4/2009 | Gitt | F16H 37/042 74/331 |
| 2009/0203484 | A1* | 8/2009 | Earhart | F16H 3/006 475/207 |
| 2009/0205450 | A1 | 8/2009 | Gitt | 74/325 |
| 2012/0259496 | A1* | 10/2012 | Ikegami | B60W 10/08 701/22 |
| 2015/0018153 | A1* | 1/2015 | Stalberg | F16H 61/66 475/33 |

FOREIGN PATENT DOCUMENTS

| | | |
|---|---|---|
| JP | 2008-014403 A | 1/2008 |
| KR | 10-2016-0067991 | 6/2016 |
| WO | WO 01/55620 A1 | 8/2001 |
| WO | WO 2008/096140 A1 | 8/2008 |
| WO | WO 2014/005774 A1 | 1/2014 |
| WO | WO 2015/076724 A1 | 5/2015 |
| WO | WO 2015/183153 A1 | 12/2015 |
| WO | WO 2015/183159 A1 | 12/2015 |

OTHER PUBLICATIONS

Written Opinion dated Mar. 27, 2018 in corresponding PCT International Application No. PCT/SE2018/050069.
European Search Report, dated Oct. 5, 2020, issued in corresponding European Patent Application No. 18751914.5. Total 8 pages.
Korean Office Action, dated Oct. 5, 2020, issued in corresponding Korean Patent Application No. 10-2019-7025422. English translation. Total 14 pages.

* cited by examiner

GEARBOX FOR VEHICLES

CROSS-REFERENCE TO RELATED APPLICATIONS

The present application is a 35 U.S.C. § 371 national phase conversion of PCT/SE2018/050069, filed Jan. 31, 2018, which claims priority of Swedish Patent Application No. 1750109-9, filed Feb. 8, 2017, the contents of all of which are incorporated herein by reference. The PCT International Application was published in the English language.

FIELD OF THE INVENTION

The present invention relates to a gearbox for vehicles and to a vehicle comprising such a gearbox according to the appended claims.

BACKGROUND AND PRIOR ART

In vehicles, and especially for heavier vehicles such as trucks, the gearbox comprises a main gearbox and often also a range gearbox, which is connected to the main gearbox. The range gearbox doubles the number of gears in the gearbox. The range gearbox usually includes a planetary gear, which has a low gear and a high gear, so that the gearbox can be divided into a low range gear position and a high range gear position. In the low range gear position, a downshift takes place through the planetary gear, and, in the high range gear position, the gear ratio is 1:1 in the planetary gear.

The range gearbox is usually provided between the main gearbox and a propeller shaft coupled to the drive wheels of the vehicle. The range gearbox is accommodated in a gearbox housing and comprises an input shaft coupled to the main gearbox, an output shaft, and the planetary gear, which is disposed between the input shaft and the output shaft. The planetary gear usually comprises three components, which are rotatably arranged relative to each other. The three components are a sun gear wheel, a planet carrier with planet gear wheels and a ring gear wheel. With knowledge of the number of teeth of the sun gear wheel and the ring gear wheel, the relative speed of the three components can be determined during operation. In a range gearbox, the sun gear wheel can be rotatably connected to the input shaft, a number of planet gear wheels, which engage the sun gear wheel, and are rotatably mounted on the planet carrier, which is fixedly connected to the output shaft, and an axially displaceable ring gear wheel, which surrounds and engages the planet gear wheels.

In a known range gearbox, the low range gear position and the high range gear position are obtained by displacing the ring gear wheel axially between the low range gear position, in which the ring gear wheel is rotationally locked relative to the gearbox housing, and the high range gear position, in which the ring gear wheel is rotatable relative to the gearbox housing and where the ring gear wheel, the planet gear wheels and the sun gear wheel rotate as a common unity. The known planetary gear comprises two coupling rings on each side of the ring gear wheel and two synchronizing rings arranged on each side of the ring gear wheel.

The document WO0155620 discloses a synchronization device in a planetary gear in a range gearbox. The planetary gear includes a sun gear wheel, a planet carrier and a ring gear wheel. The sun gear wheel is rotatably connected with the input shaft and a number of planet gear wheels engaging with the sun gear wheel, which planet gear wheels are rotatably mounted on the planet carrier, which is connected to the output shaft. An axially displaceable ring gear wheel surrounds and meshes with the planet gear wheels. Low and high gears are obtained by displacing the ring gear wheel axially between a low range gear position and a high range gear position.

However, there are range gearboxes in which the synchronization devices are replaced with coupling sleeves provided with splines. By controlling the transmission to synchronous speed between the two components to be assembled, an axial displacement of the coupling sleeve along the two components is made possible in order to connect them. When the components should be detached, the transmission is controlled so that torque balance occurs between the components so that the coupling sleeve is not transmitting torque. It then becomes possible to move the coupling sleeve along the components in order to disengage them from each other.

The document U.S. Pat. No. 6,196,944 shows a planetary gear comprising a sun gear wheel, a planet carrier with planet gear wheels and a ring gear wheel. The sun gear wheel may be connected to the input shaft by means of a coupling sleeve in a low range gear position and disengaged from the input shaft in a high range gear position. In the high range gear position, the input shaft is connected to the planet carrier by means of the same coupling sleeve. The ring gear wheel is firmly connected to a gearbox housing. The known planetary gear is arranged in an auxiliary gearbox, having only two gear positions.

The reverse gear in a transmission in a vehicle is often arranged in the main gearbox, which then comprises a gear that is engaged when the vehicle is to be driven in the reversed direction. The gear wheels, which are intended for the reverse gear, cause an elongation of the main gearbox, and an undesired increase in weight of the vehicle.

The document WO2015/183153A1 shows a gearbox for vehicles comprising a range gearbox provided with a first, a second and a third axially movable coupling sleeves acting on a planetary gear in the range gearbox. Depending on the axial position of the coupling sleeves, a reverse gear in the gearbox may be achieved.

The range gearbox must have a diameter, a length and a weight within reasonable limits. If the diameter of the planetary gear in the range gearbox is too large, the gearbox will not fit in a vehicle due to geometrical and design limits of the vehicle. An increased diameter of the planetary gear in the range gearbox also results in an increased weight, which results in an increased overall weight of the vehicle. This may lead to an increase in the fuel consumption of the vehicle.

When the planetary gear in the range gearbox is designed with a limited diameter, the gear ratio in the range gearbox will be limited to a certain amount. This may affect the driveability of the vehicle in the reverse direction since of the vehicle may not be driven with a velocity low enough in the reverse direction when a clutch between an engine and the gearbox is completely engaged.

Since the gearbox must transmit a considerable amount of torque, the gear ratio may not be increased by minimizing the diameter of the sun gear wheel. If the sun gear wheel has a very small diameter, it may not withstand the considerable amount of torque needed. In addition, by using a small sun gear wheel, the diameter of the planet gear wheels may get into physical contact with each other due to an increased diameter of the planet gear wheels.

SUMMARY OF THE INVENTION

There is a need for a gearbox provided with a reverse gear in a range gearbox. There is also a need for a gearbox, which exhibits small dimensions relative to the possible transmission of torque. There is also a need for a gearbox where all components in the gearbox are utilized effectively so that low energy is required when shifting. In addition, there is a need for a gearbox, which brings the overall components in the gearbox to a minimum in order to save manufacturing and repair costs.

The object of the present invention is therefore to further develop a gearbox provided with a reverse gear in a range gearbox.

A further object of the invention is to provide a gearbox, having small dimensions in relation to possible transmission of torque.

Another object of the present invention is to provide a gearbox, which brings the overall components in the gearbox to a minimum in order to save manufacturing and repair costs.

A further object of the invention is to provide a gearbox that utilizes all of the transmission components effectively.

A further object of the present invention is to provide a gearbox which requires low energy for shifting.

These objects are achieved with the above-mentioned gearbox according to the appended claims.

According to an aspect of the invention, a gearbox for vehicles is provided. The gearbox comprises a split gearbox, a main gearbox and a range gearbox, which is shiftable into a low range gear position and a high range gear position. The range gearbox comprises a planetary gear with a ring gear wheel, a sun gear wheel and a planet carrier, on which at least one planet gear wheel is rotatably mounted. The ring gear wheel and the sun gear wheel engage with the at least one planet gear wheel. A gearbox housing surrounds the planetary gear. A first axially movable coupling sleeve is arranged to engage the planet carrier with the gearbox housing, and a second axially movable coupling sleeve is arranged to engage the ring gear wheel with an output shaft for shifting into a reverse gear in the gearbox. A crawler gear in the main gearbox is arranged to transfer torque through the gearbox when the range gearbox is shifted into the reverse gear.

The vehicle may be driven in the reverse direction when the planetary gear in the range gearbox is shifted into the reverse gear. The arrangement of a crawler gear for the transfer of torque through the gearbox, when the range gearbox is shifted into the reverse gear, facilitates the vehicle to be driven in the reverse direction at a velocity, which is low enough for the driver of the vehicle to have control over the vehicle even when a clutch between an engine and the gearbox is completely engaged. The gear ratio of the crawler gear results in that the range gearbox may have a limited diameter and while the driveability of the vehicle in the reverse direction is not adversely affected. A limited diameter of the range gearbox will bring the overall components in the gearbox to a minimum, and thus manufacturing and repair costs will be saved. The sun gear wheel in the planetary gear may be provided with a diameter, which withstands the considerable amount of torque needed. Thus, there is no need to increase the gear ratio of the planetary gear in the range gearbox by minimizing the diameter of the sun gear wheel.

According to a further aspect of the invention, the gear ratio of the crawler gear is in the range 3.1:1=3.9:1. When the gear ratio of the crawler gear is in the range 3.1:1-3.9:1, the vehicle may be driven in the reverse direction in a velocity, which is low enough to have control over the vehicle. Thus, the driveability of the vehicle in the reverse direction will be acceptable. The overall dimensions of the gearbox can be reduced. In addition, there is no need to increase the gear ratio of the planetary gear in the range gearbox by minimizing the diameter of the sun gear wheel.

According to a further aspect of the invention, the gear ratio of the crawler gear is in the range 3.4:1-3.6:1. When the gear ratio of the crawler gear is in the range 3.4:1-3.6:1, the vehicle may be driven in the reverse direction in a velocity, which is low enough to have control over the vehicle. Thus, the driveability of the vehicle in the reverse direction will be improved. The overall dimensions of the gearbox can be reduced further. In addition, there is no need to increase the gear ratio of the planetary gear in the range gearbox by minimizing the diameter of the sun gear wheel.

According to a further aspect of the invention, the crawler gear is only engaged when the gearbox is shifted into the reverse gear, and also in the forward direction when the range gearbox is shifted into the low range position, but not in the high range position. In comparison to other gears used when driving a vehicle in the forward direction, the reverse gear is less used and also the crawler gear in the forward direction is less used. In addition, the torque transferred through the crawler gear is less than the torque transferred through other gears in the gearbox due to the high gear ratio in the crawler gear. For this reason, a limited wear of the crawler gear can be expected. Therefore, the crawler gear may be designed for bringing the overall dimensions of the gearbox to a minimum.

According to a further aspect of the invention, the planetary gear is arranged to have a gear ratio in the range 3.1:1-3.9:1 when shifted into the reverse gear. When the gear ratio of the planetary gear is in the range 3.1:1-3.9:1, the vehicle may be driven in the reverse direction at a velocity, which is low enough to have control over the vehicle. Thus, the driveability of the vehicle in the reverse direction will be acceptable. The overall dimensions of the gearbox can be reduced. Also, there is no need to increase the gear ratio of the planetary gear in the range gearbox by minimizing the diameter of the sun gear wheel.

According to a further aspect of the invention, the planetary gear is arranged to have a gear ratio in the range 3.3:1-3.6:1 when shifted into the reverse gear. When the gear ratio of the planetary gear is in the range 3.3:1-3.6:1, the vehicle may be driven in the reverse direction at a velocity, which is low enough to have control over the vehicle. Thus, the driveability of the vehicle in the reverse direction will be improved. The overall dimensions of the gearbox can be reduced further. In addition, there is no need to increase the gear ratio of the planetary gear in the range gearbox by minimizing the diameter of the sun gear wheel.

According to a further aspect of the invention, the split gearbox and the main gearbox are together arranged to have a largest gear ratio, which is larger than the gear ratio of the planetary gear in the range gearbox when shifted into the reverse gear. This results in that the split gearbox and the main gearbox together will have a large ratio spread. This way, the vehicle may be driven in the reverse direction at a velocity, which is low enough to have control over the vehicle. Thus, the driveability of the vehicle in the reverse direction will be very good. The overall dimensions of the gearbox can be reduced and there is no need to increase the gear ratio of the planetary gear in the range gearbox by minimizing the diameter of the sun gear wheel. The definition of the ratio spread is the largest common gear ratio of the split gearbox and the main gearbox divided with the minimum common gear ratio of the split gearbox and the main gearbox.

According to a further aspect of the invention, the width of a crawler gear wheel of the crawler gear is smaller than the width of a gear wheel in a gear in the main gearbox having the second largest gear ratio. In comparison to gears used when driving a vehicle in the forward direction, the reverse gear and the crawler gear are less used. In addition, the torque transferred through the crawler gear is less than the torque transferred through other gears in the gearbox due to the high gear ratio in the crawler gear. For this reason, a limited wear of the crawler gear can be expected. Thus, the crawler gear may be designed with a width that is smaller than the width of a gear wheel in a gear in the main gearbox having the second largest gear ratio, because the wear of the crawler gear may be limited. This may also reduce the length of the gearbox.

According to a further aspect of the invention, one crawler gear wheel of the crawler gear is arranged on a mainshaft in the main gearbox and the another crawler gear wheel of the crawler gear is arranged on a layshaft. This way, torque may be transferred through the crawler gear in the gearbox.

According to a further aspect of the invention, the gearbox is arranged to have an overlapping gear ratio in at least the highest gear in the low range gear position and at least the lowest gear in a high range gear position. The overlapping gear ratio will increase the ratio spread in the gearbox. Such a gearbox brings the overall components in the gearbox to a minimum and utilizes all of the transmission components effectively.

According to a further aspect of the invention, the gearbox is arranged to have an overlapping gear ratio in the two highest gear in the low range gear position and the two lowest gear in a high range gear position. The overlapping gear ratio in the two highest gears in the low range gear position and the two lowest gears in a high range gear position will increase the ratio spread in the gearbox. This way, the vehicle may be driven in the reverse direction in a low enough velocity to have control over the vehicle. The driveability of the vehicle in the reverse direction will be very good. Such a gearbox brings the overall components in the gearbox to a minimum and utilizes all of the transmission components effectively.

The above-mentioned objects are also achieved by a vehicle, including the above-mentioned gearbox, according to the appended claims.

BRIEF DESCRIPTION OF THE DRAWINGS

Below is a description of, as examples, preferred embodiments of the invention with reference to the enclosed drawings, in which.

DETAILED DESCRIPTION OF PREFERRED EMBODIMENTS OF THE INVENTION

Figure 1:
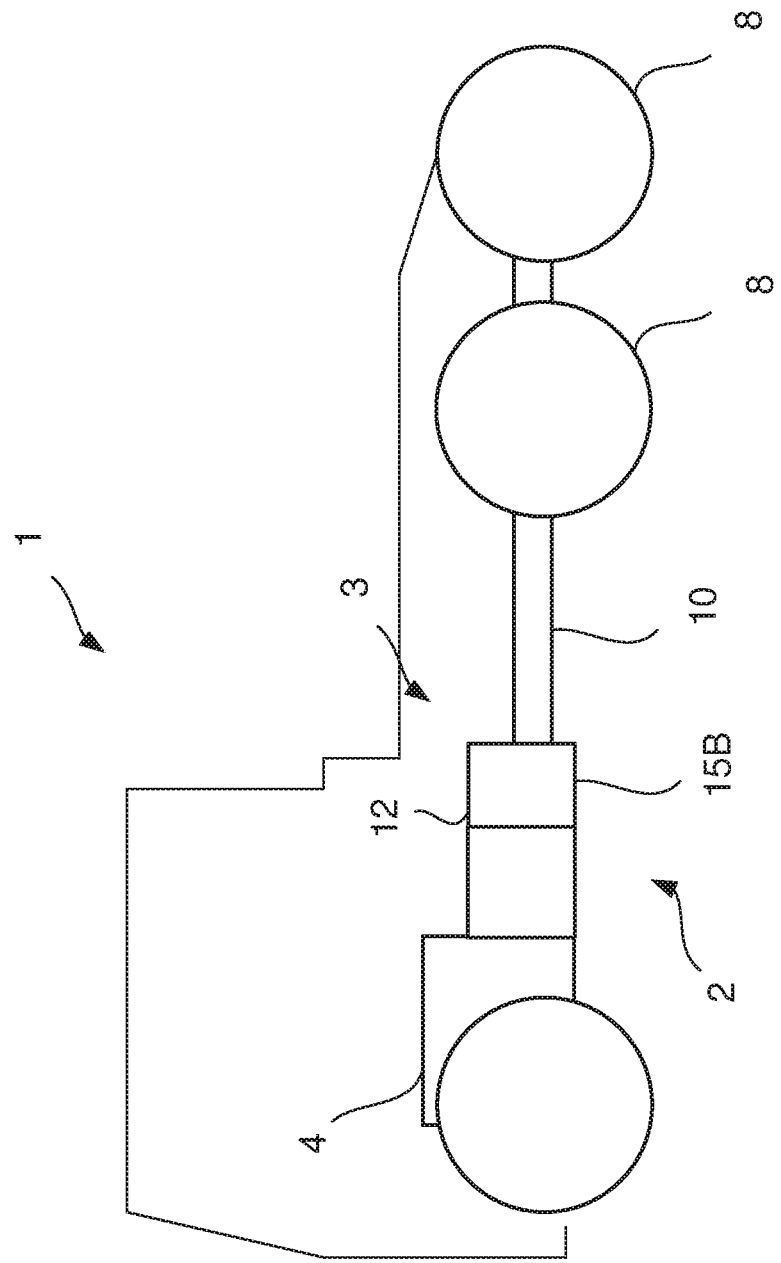
FIG. 1 shows schematically a side view of a vehicle with a gearbox according to the invention.

FIG. 1 shows schematically a side view of a vehicle 1, provided with a powertrain 3, which comprises a gearbox 2 according to the invention. The powertrain 3 also comprises an internal combustion engine 4, a propeller shaft 10 and drive wheels 8. The drive wheels 8 are coupled to the gearbox 2 via the propeller shaft 10. The gearbox 2 comprises a range gearbox 15B, which aims to double the number of gear opportunities. The gearbox 2 is surrounded by a gearbox housing 12.

Figure 2:
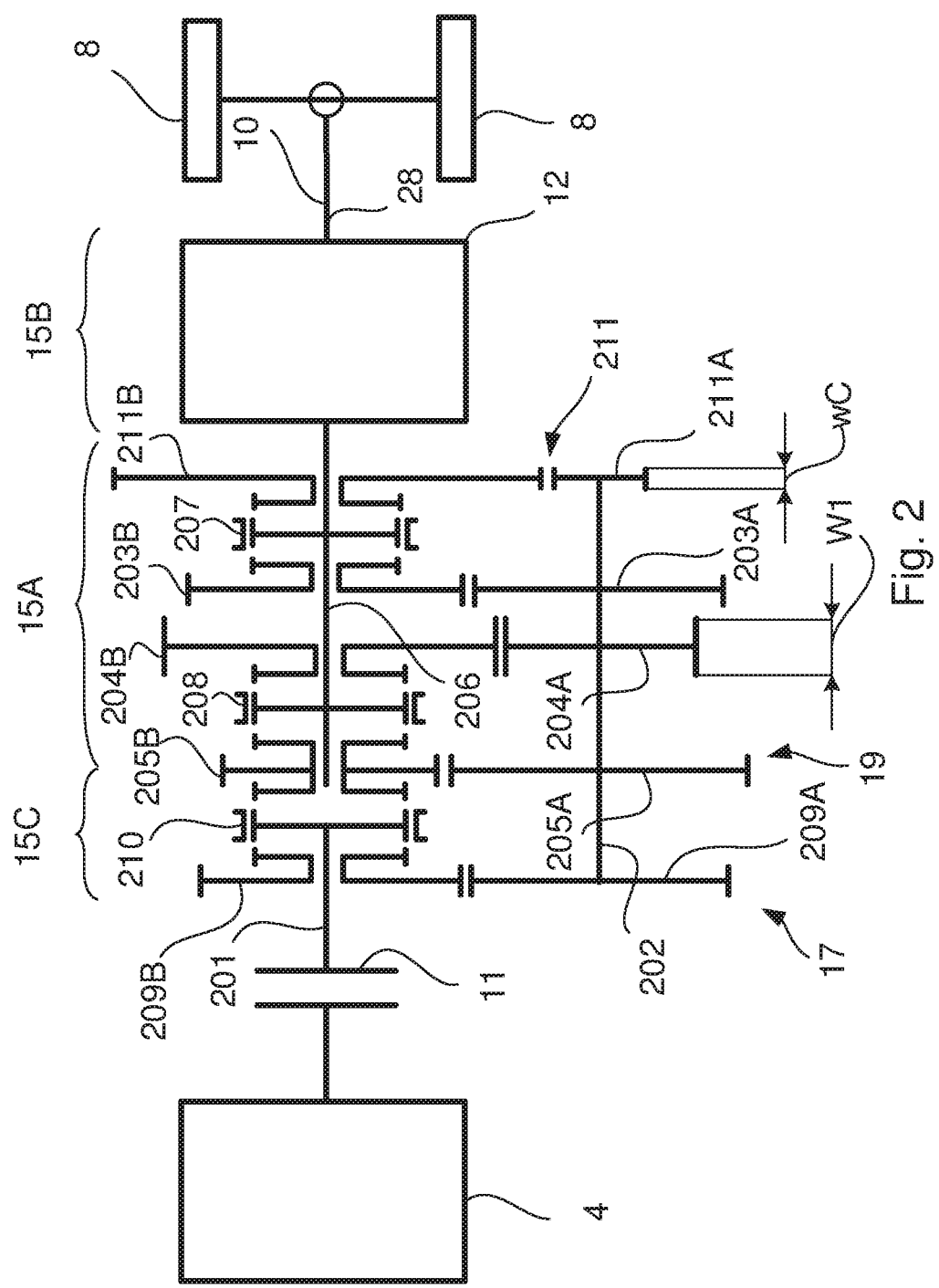
FIG. 2 shows schematically a cross section of the main gearbox and a split gearbox according to the invention.

FIG. 2 shows a schematic sectional view of a gearbox 2 according to the present invention. The gearbox 2 comprises a main gearbox 15A, a split gearbox 15C and the range gearbox 15B. The range gearbox 15B is shiftable into a low range gear position, a high range gear position and a reverse gear position, which will be explained in more detail below. The vehicle 1 may be driven in the reverse direction when the range gearbox 15B is shifted into the reverse gear. The largest gear ratio in the split gearbox 15C and the main gearbox 15A together may be larger than the gear ratio in a planetary gear 14 (FIG. 3) in the range gearbox 15B, when the planetary gear 14 is shifted into the reverse gear. The split gearbox 15C and the main gearbox 15A may together be arranged to have a largest gear ratio over 4:1 and the planetary gear 14 in the range gearbox 15B may be arranged to have a gear ratio less than 4:1 when shifted into the reverse gear. With such a common gear ratio in the split gearbox 15C and the main gearbox 15A in relation to the gear ratio in the range gearbox 15B, the vehicle 1 may be driven in the reverse direction at a velocity, which is low enough to have control over the vehicle 1 even though a clutch 11 between the engine 4 and the gearbox 2 is completely engaged. A crawler gear 211 in the main gearbox 15A is, according to the invention, engaged when a reverse gear is engaged in the range gearbox 15B. The velocity of the vehicle 1 driven in the reverse direction at a gear with the gear ratio mentioned above and with the clutch 11 completely engaged will be below three km/h.

According to FIG. 2, the main gearbox 15A alone can be set to four different gear ratios. The range gearbox 15B is arranged downstream of the main gearbox 15A. The range gearbox 15B is surrounded by a gearbox housing 12 and is discussed further with reference to FIGS. 3-5. The split gearbox 15C is located upstream of the main gearbox 15A in the direction of the torque from the combustion engine 4 to drive the wheels 8. The split gearbox 15C duplicates the number of gears of the main gearbox 15A in order to provide more gear ratios of the gearbox 2.

Instead of a disengageable clutch 11, first and second electrical machines (not disclosed) may be arranged to rotate and brake a planetary gear 14 (not disclosed) arranged in the powertrain 3 and located upstream of the gearbox 2. In such an arrangement, the first electrical machine may be arranged at a sun gear wheel (not disclosed) of the planetary gear 14, and the second electrical machine may be arranged at the first ring gear wheel (not disclosed) of the planetary gear 14. The first and second electrical machines may be the power source or may form part of the power source.

With regard to the main gearbox 15A, a layshaft 202 comprises gear wheels 203A, 204A, 205A that are rotatably fixed to the layshaft 202. For example, the gear wheel 203A represents the second gear, the gear wheel 204A represents the first gear, and the gear wheel 205A represents the third gear. A mainshaft 206 comprises corresponding gear wheels 203B, 204B, 205B, which rotate freely in relation to the mainshaft 206, but which can be selectively locked for rotation with the mainshaft 206 in order to engage a gear. For example, the second main gearbox gear can be engaged by manoeuvring a first main sleeve 207, arranged to rotate with the mainshaft 206, to a position where the gear wheel 203B is engaged, i.e. to the left in the figure, thereby bringing the gear wheel 203B to rotate the mainshaft 206 and to engage the layshaft 202 to the mainshaft 206 via the gear wheel 203A. Each pair of the gear wheels on the layshaft 202 and the mainshaft 206 represent a gear ratio.

The first main gearbox gear can be engaged by disengaging the first main sleeve 207 from the gear wheel 203B and instead moving a second main sleeve 208 to a position to the right in the figure where gear wheel 204B is engaged, thereby bringing the gear wheel 204B to rotate the mainshaft 206. Correspondingly, the third main gearbox gear can be engaged by manoeuvring the second main sleeve 208 to a position to the left in the figure where a gear wheel 205B is engaged, thereby setting the main gearbox 15A to third gear. Each of the first through third gears is used for a plurality of the total number of gears provided by the gearbox 2 as a whole. For example, the first gear of the main gearbox 15A will be used for the first and the second gears of the gearbox 2, the low and the high split, the low range, and also for the seventh and the eighth gears, the low and the high split, and the high range. The different gears in the split gearbox 15C and the main gearbox 15A may also be used when the range gearbox 15B is shifted into the reverse gear.

The crawler gear 211 in the main gearbox 15A comprises a crawler gear wheel pair 211A and 211B. The crawler gear wheel 211A is arranged on the layshaft 202 and the crawler gear wheel 211B may rotate freely in relation to the mainshaft 206, but can be selectively locked for rotation with the mainshaft 206 in order to engage the crawler gear 211.

Further, with regard to the split gearbox 15C, the incoming gear 17 comprises an incoming gear wheel 209A that, similar to the above, is rotatably fixed to the layshaft 202 and a corresponding incoming gear wheel 209B that rotates freely in relation to the input shaft 201 but which can be selectively locked for rotation with the input shaft 201 through a split sleeve 210, which may be provided with a split synchronising unit. The split sleeve 210 can further be used to connect the gearbox input shaft 201 to gear wheel 205B directly. The incoming gear 17, which comprises the gear wheel pair 209A-B can together with the split sleeve 210 thereby provide two different split gear ratios for each gear of the main gearbox 15A into two parts.

When, for example, the first gear is engaged, the split sleeve 210 is arranged to engage the split gear wheel 205B. Consequently, the input shaft 201 is directly connected to the split gear wheel 205B, which, via the split gear wheel 205A, establishes a first gear ratio between the input shaft 201 and the layshaft 202. The gear wheel 205B, however, is not connected to the mainshaft 206, but the layshaft 202 is connected to the mainshaft 206 through the gear wheel pair 204A-B and by means of the second main sleeve 208.

When the second gear is engaged (i.e. high split of the first main gearbox gear) the vehicle 1 is, instead, driven with the gear wheel pair 209A-B engaged, resulting in a second gear ratio between an input shaft 201 and the layshaft 202. The gear wheel 204B is still engaged by the second main sleeve 208 according to the above, thereby extending the range of each gear.

This split can be performed for each gear of the main gearbox 15A. However, when the coupling unit 210 engages gear wheel 205B and also the second main sleeve 208 engages the gear wheel 205B a gear ratio of 1:1 through the split gearbox 15C and the main gearbox 15A is obtained.

The crawler gear 211 is, according to the invention, engaged when the reverse gear is engaged in the range gearbox 15B. A first reverse gear is engaged when also the split sleeve 210 is arranged to engage the split gear wheel 205B. This will have the result that the input shaft 201 is directly connected to the split gear wheel 205B, which, via the split gear wheel 205A, establishes a gear ratio between the input shaft 201 and the layshaft 202.

The crawler gear 211 in the main gearbox 15A is arranged to transfer torque through the gearbox 2 when the range gearbox 15B is shifted into the reverse gear. Thus, when a reverse gear is engaged in the range gearbox 15B, the crawler gear 211 is engaged. Due to the crawler gear 211, the vehicle 1 may be driven in the reverse direction at a velocity, which is low enough for a driver of the vehicle 1 to have control over the vehicle 1.

As an example, the gear ratio of the crawler gear is in the range 3.1:1-3.9:1. When the gear ratio of the crawler gear 211 is in the range 3.1:1-3.9:1, the vehicle 1 may be driven in the reverse direction at a velocity, which is low enough to have control over the vehicle 1. Thus, the driveability of the vehicle 1 in the reverse direction will be acceptable. The overall dimensions of the gearbox 2 can be reduced. Also, there is no need to increase the gear ratio of the planetary gear 14 in the range gearbox 15B by minimizing the diameter of the sun gear wheel 18.

According to another example, the gear ratio of the crawler gear 211 is in the range 3.4:1-3.6:1. When the gear ratio of the crawler gear 211 is in the range 3.4:1-3.6:1, the vehicle 1 may be driven in the reverse direction at a velocity, which is low enough to have control over the vehicle 1. Thus, the driveability of the vehicle 1 in the reverse direction will be improved. The overall dimensions of the gearbox 2 can be reduced further. Also, there is no need to increase the gear ratio of the planetary gear 14 in the range gearbox 15B by minimizing the diameter of the sun gear wheel 18.

The crawler gear 211 is only engaged when the gearbox 2 is shifted into the reverse gear, and in the forward direction when the range gearbox 15B is shifted into the low range position. In comparison to other gears used when driving a vehicle 1 in the forward direction, such as the gear wheel pair 204A-B representing the first gear in the main gearbox 15A, the reverse gear is less used and also the crawler gear 211 in the forward direction is less used. Also, the torque transferred through the crawler gear 211 is less than the torque transferred through the other gears in the gearbox 2, such as the gear wheel pair 204A-B, due to the high gear ratio in the crawler gear 211. For this reason, the wear of the crawler gear wheel pair 211A and 211B will be limited. Thus, the crawler gear wheels 211A and 211B may be designed for bringing the overall dimensions of the gearbox 2 to a minimum. The width wC of the crawler gear wheel 211A arranged on the layshaft 202 and the width wC of the crawler gear wheel 211B arranged on the mainshaft 206 are smaller than the width W1 of the gear wheel pair 204A-B representing the first gear in the main gearbox 15A. Thus, the gear wheel pair 204A and 204B in the main gearbox 15A have the second largest gear ratio after the gear ratio of the crawler gear 211. In comparison to gears used when driving a vehicle 1 in the forward direction, the reverse gear is less used. The crawler gear wheels 211A and 211B may thus be designed with a width wC that is smaller than the width W1 of the gear wheel pair 204A-B, which have the second largest gear ratio in the main gearbox 15A, because the wear of the crawler gear wheels 211A and 211B may be less than the wear of the gear wheels 204A and 204B. The smaller width wC of the crawler gear wheels 211A and 211B will bring the length of the gearbox 2 shorter.

According to FIG. 2, the crawler gear 211 is arranged in the main gearbox 15A. However, it may also be possible to arrange the crawler gear 211 in the split gearbox 15C, so that the crawler gear wheel 211A is arranged on the input shaft 201 and the crawler gear wheel 211B is arranged on the layshaft 202.

According to a further aspect of the invention, the planetary gear 14 is arranged to have a gear ratio 3.1:1-3.9:1 when shifted into the reverse gear. When the gear ratio of the planetary gear 14 is in the range 3.1:1-3.9:1, the vehicle 1 may be driven in the reverse direction at a velocity, which is low enough to have control over the vehicle 1. Thus, the driveability of the vehicle 1 in the reverse direction will be acceptable. The overall dimensions of the gearbox 2 can be reduced. Also, there is no need to increase the gear ratio of the planetary gear 15 in the range gearbox 15B by minimizing the diameter of the sun gear wheel 18.

According to a further aspect of the invention, the planetary gear 14 is arranged to have a gear ratio in the range 3.3:1-3.6:1 when shifted into the reverse gear. When the gear ratio of the planetary gear 14 is in the range 3.3:1-3.6:1, the vehicle 1 may be driven in the reverse direction in a velocity, which is low enough to have control over the vehicle 1. Thus, the driveability of the vehicle 1 in the reverse direction may be improved. The overall dimensions of the gearbox 2 may be reduced further. Also, there is no need to increase the gear ratio of the planetary gear 14 in the range gearbox 15B by minimizing the diameter of the sun gear wheel 18.

The two highest gears in the low range gear position and the two lowest gears in a high range gear position may be overlapping. Thus, the two highest gears in the low range gear positions may have substantially the same gear ratio as the two lowest gears in a high range gear position. However, at least the highest gear in the low range gear position and at least the lowest gear in a high range gear position should be overlapping. Thus, at least the highest gear in the low range gear positions should have substantially the same gear ratio as at least the lowest gear in a high range gear position. This overlapping gear ratio will increase the total gear ratio in the gearbox 2. This will bring the overall components in the gearbox 2 to a minimum and also utilize all of the transmission components effectively.

The split gearbox 15C comprises an incoming gear 17 and a split gear 19. The gear ratio of the split gear 19 may be larger than the gear ratio of the incoming gear 17, so that the overall gear ratio in the gearbox 2 may be increased. As an example, the gear ratio of the incoming gear 17 may be in the range 0.9:1-1.1:1 and thus the gear ratio of the split gear 19 may be larger than 0.9:1-1.1:1. When the gear ratio of the incoming gear 17 is in the range 0.9:1-1.1:1, the overall gear ratio of the gearbox 2 may be increased and the vehicle 1 may be driven in the reverse direction at a velocity that is low enough for a driver of the vehicle 1 to have control over the vehicle 1. Thus, the driveability of the vehicle 1 in the reverse direction will be acceptable. The overall dimensions of the gearbox 2 can be reduced. Also, there is no need to increase the gear ratio of the planetary gear 14 in the range gearbox 15B by minimizing the diameter of the sun gear wheel 18.

According to another example, the gear ratio of the incoming gear 17 may be in the range 0.95:1-1.05:1 and thus the gear ratio of the split gear 19 may be larger than 0.95:1-1.05:1. When the gear ratio of the incoming gear 17 is in the range 0.95:1-1.05:1, the overall gear ratio of the gearbox 2 may be increased and the vehicle 1 may be driven in the reverse direction at a velocity, which is low enough for a driver of the vehicle 1 to have control over the vehicle 1. Thus, the driveability of the vehicle 1 in the reverse direction may be improved. The overall dimensions of the gearbox 2 can be reduced further. Also, there is no need to increase the gear ratio of the planetary gear 14 in the range gearbox 15B by minimizing the diameter of the sun gear wheel 18.

The gear ratio of the incoming gear 17 may also be substantially 1:1 and thus the gear ratio of the split gear 19 may be larger than 1:1. When the gear ratio of the incoming gear 17 is substantially 1:1, the overall gear ratio of the gearbox 2 may be increased and the vehicle 1 may be driven in the reverse direction at a velocity, which is low enough for a driver of the vehicle 1 to have control over the vehicle 1. Thus, the driveability of the vehicle 1 in the reverse direction will be very good. The overall dimensions of the gearbox 2 can be reduced even further. Also, there is no need to increase the gear ratio of the planetary gear 14 in the range gearbox 15B by minimizing the diameter of the sun gear wheel 18.

The split gearbox 15C and the main gearbox 15A may together be arranged to have a combined ratio spread in the range 5.5-6.3 and the planetary gear 14 is arranged to have a gear ratio in the range 3.1:1-3.9:1 when shifted into the reverse gear. With such a combined ratio spread in the split gearbox 15C and the main gearbox 15A together with such a gear ratio in the range gearbox 15B, the vehicle 1 may be driven in the reverse direction at a velocity, which is low enough for a driver of the vehicle 1 to have control over the vehicle 1. Thus, the driveability of the vehicle 1 in the reverse direction will be acceptable. The overall dimensions of the gearbox 2 can be reduced. Also, there is no need to increase the gear ratio of the planetary gear 14 in the range gearbox 15B by minimizing the diameter of the sun gear wheel 18. The definition of the ratio spread is the largest combined or common gear ratio of the split gearbox 15C and the main gearbox 15A divided with the minimum combined or common gear ratio of the split gearbox 15C and the main gearbox 15A.

As an alternative, the split gearbox 15C and the main gearbox 15A may together be arranged to have a combined ratio spread in the range 5.7-6.1 and the planetary gear 14 is arranged to have a gear ratio in the range 3.3:1-3.6:1 when shifted into the reverse gear. With such a combined ratio spread in the split gearbox 15C and the main gearbox 15A together with such a gear ratio in the range gearbox 15B, the vehicle 1 may be driven in the reverse direction at a velocity, which is low enough for a driver of the vehicle 1 to have control over the vehicle 1. Thus, the driveability of the vehicle 1 in the reverse direction will be improved. The overall dimensions of the gearbox 2 can be reduced further. Also, there is no need to increase the gear ratio of the planetary gear 14 in the range gearbox 15B by minimizing the diameter of the sun gear wheel 18.

From above, it is evident that the split gearbox 15C and the main gearbox 15A are together arranged to have a highest gear ratio, which is larger than the gear ratio of the planetary gear 14 in the range gearbox 15B when shifted into the reverse gear. Consequently, the split gearbox 15C and the main gearbox 15A together will have a large combined ratio spread, which in total will be over 5.

Figure 3:
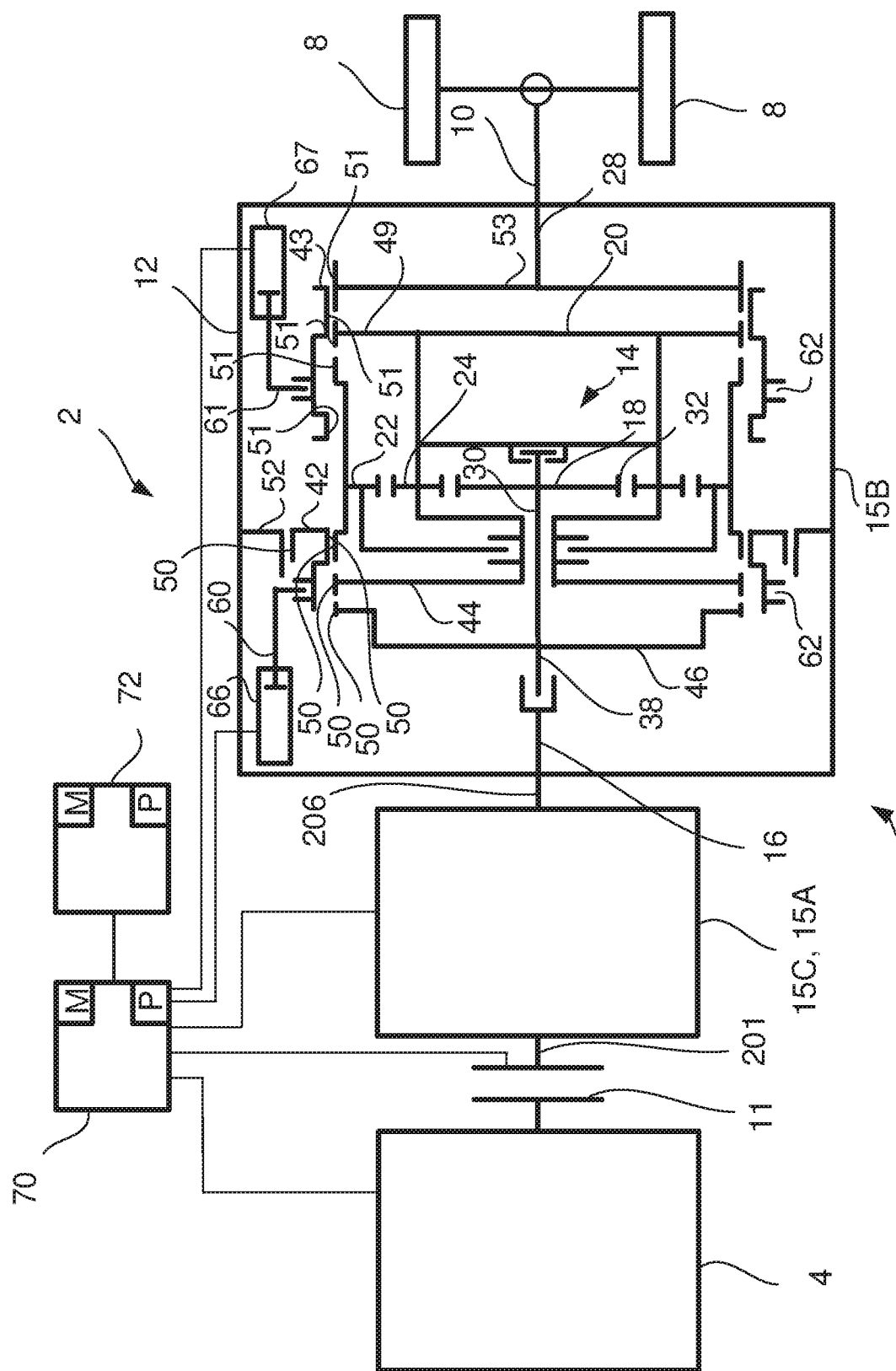
FIG. 3 shows schematically a cross section of the gearbox according to the invention in a low range gear position.

FIG. 3 shows a schematic sectional view of a gearbox 2 of the present invention. The gearbox 2 comprises a main gearbox 15A, a split gearbox 15C and the range gearbox 15B. The range gearbox 15B comprises a planetary gear 14, which has a low and a high gear, so that the switching capability of the gearbox 2 can be divided into a low range gear position and a high range gear position. In a first gear position corresponding to the low range gear position, a downshift takes place in the planetary gear 14. In the high range gear position, the gear ratio is 1:1 in the planetary gear 14. The planetary gear 14 in FIG. 3 is shifted into the first gear position, corresponding to the low range gear position.

The range gearbox 15B is accommodated in the gearbox housing 12 and comprises a range gearbox input shaft 16 that may be a mainshaft 26 of the main gearbox 15A. The planetary gear 14 comprises three main components, which are rotatably arranged in relation to each other, namely a sun gear wheel 18, a planet carrier 20 and a ring gear wheel 22. A number of planet gear wheels 24 are rotatably arranged with bearings on the planet carrier 20. With knowledge of the number of teeth 32 of the sun gear wheel 18 and the ring gear wheel 22, the relative gear ratio of the three components can be determined. The sun gear wheel 18 is rotatably connected to the input shaft 16 and the planet gear wheels 24 engage the sun gear wheel 18. The ring gear wheel 22 surrounds and engages the planet gear wheels 24.

A first axially displaceable coupling sleeve 42 is, in a first gear position, arranged to connect, the transmission case 12 with the ring gear wheel 22 and, in a second gear position, arranged to disconnect the transmission case 12 from the ring gear wheel 22. The first axially movable coupling sleeve 42 is, in the first gear position, arranged to disconnect the input shaft 16 from the planet carrier 20.

A second axially displaceable coupling sleeve 43 is in a third gear position arranged to couple the ring gear wheel 22 with an output shaft 28 of the gearbox 2. The output shaft 28 is coupled to the propeller shaft 10 of the vehicle 1. In the third gear position, corresponding to a reverse gear, the first axially displaceable coupling sleeve 42 is arranged to disconnect the input shaft 16 from the planet carrier 20 and to interconnect the planet carrier 20 with the gearbox housing 12. In the first and second gear positions the second axially displaceable coupling sleeve 43 is arranged to interconnect the planet carrier 20 with the output shaft 28.

The first axially displaceable coupling sleeve 42 is on an inner surface provided with first splines 50 arranged to interact with the corresponding first splines 50 on the ring gear wheel 22 and on the periphery of a projection 52, which is fixedly connected to the transmission housing 12. The first splines 50 on the first axially displaceable coupling sleeve 42 are also arranged to cooperate with corresponding first splines 50 on the input shaft 16. Corresponding first splines 50 disposed on the input shaft 16 are formed on the periphery of a first sprocket 46, which is mounted on a shaft 38 for the sun gear wheel 18. The first splines 50 on the first axially displaceable coupling sleeve 42 are also arranged to cooperate with corresponding first splines 50 on the planet carrier 20. Corresponding first splines 50 disposed on the planet carrier 20 are formed on the periphery of a second sprocket 44, which is mounted on the planet carrier 20.

The second axially displaceable coupling sleeve 43 is on an inner surface provided with second splines 51, which are arranged to cooperate with corresponding second splines 51 on the ring gear wheel 22, the planet carrier 20 and the output shaft 28. The corresponding second splines 51 arranged on the planet carrier 20 are formed on the periphery of a third sprocket 49, which is mounted on the planet carrier 20. The corresponding second splines 51 provided on the output shaft 28 are formed on the periphery of a fourth sprocket 53, which is mounted on the output shaft 28.

The low gear in the gearbox 2 is obtained by displacing the first coupling sleeve 42, so that the ring gear wheel 22 is connected to the gearbox housing 12. The axial displacement of the first and the second coupling sleeves 42, 43 are provided with a first and second shift forks 60, 61 arranged in an outside circumferential groove 62 in the respective coupling sleeves 42, 43. The first shift fork 60 is influenced by a first power means 66 and the second shift fork 61 is influenced by a second power means 67. The first and second power means 66, 67 may be pneumatic or hydraulic cylinders. The shift forks 60, 61 and power means 66, 67 are schematically shown in FIG. 3.

Preferably, the coupling sleeves 42, 43 each has a low weight, which means that low energy and force are needed to move the respective coupling sleeves 42, 43 when shifting gears. This allows a quick gear shifting between the different gear positions in the gearbox 2.

Figure 4:
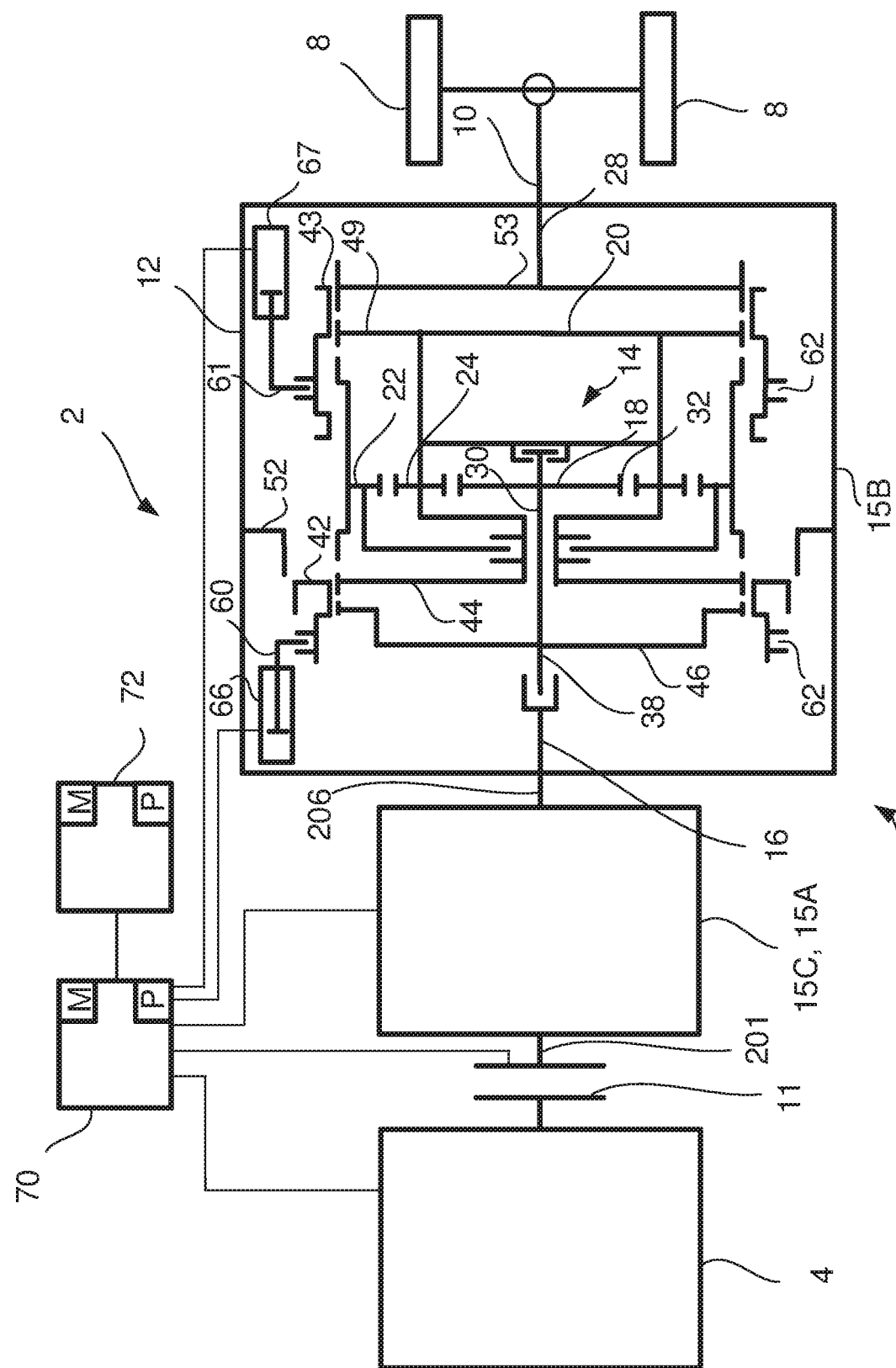
FIG. 4 shows schematically a cross section of the gearbox according to the invention in a high range gear position.

FIG. 4 shows a schematic sectional view of the range gearbox 15B in the second gear position or the high range gear position in which the first coupling sleeve 42 is shifted to the right in FIG. 4 for connecting the input shaft 16 to the planet carrier 20. The first coupling sleeve 42 has in this position disconnected the ring gear wheel 22 of the gearbox housing 12. The transmission of torque from the input shaft 16 to the output shaft 28 is in the high range gear position via the input shaft 16 and the planet carrier 20 and further to the output shaft 28 via the second coupling sleeve 43, so that the gear ratio through the planetary gear 14 becomes 1:1. As an alternative, the second axially movable coupling sleeve 43 may in the second gear position be arranged to engage the ring gear wheel 22 with the output shaft 28.

Figure 5:
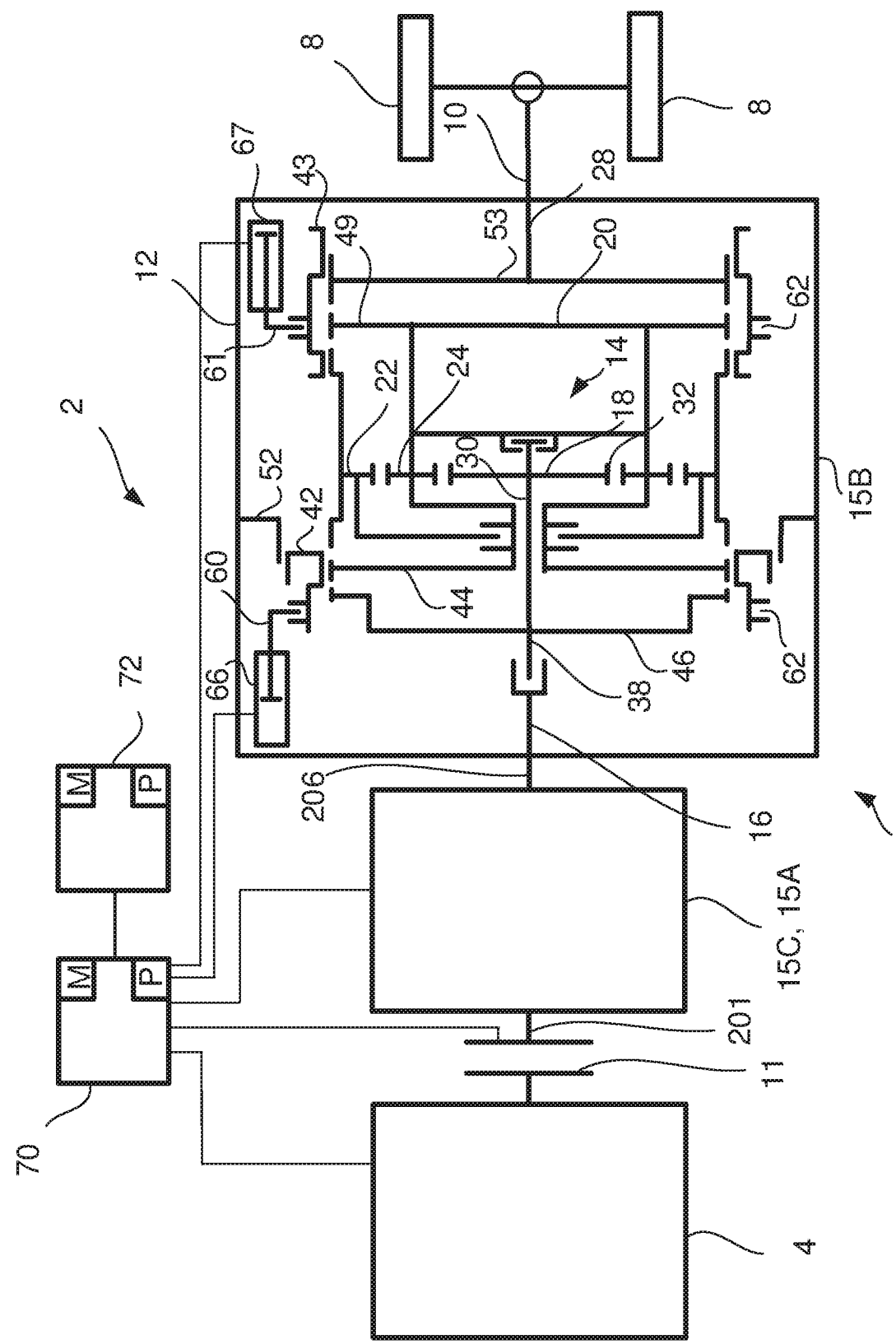
FIG. 5 shows schematically a cross section of the gearbox according to the invention in a reverse position.

In FIG. 5, the range gearbox 15B has been shifted into the third gear position, which is the reverse gear. The second axially displaceable sleeve 43 is in the third gear position arranged to connect the ring gear wheel 22 with the output shaft 28. Thus, the second coupling sleeve 43 is shifted by the second shift fork 61, so that the ring gear wheel 22 is connected to the output shaft 28. The first coupling sleeve 42 is shifted by the first shift fork 60 to couple the planet carrier 20 with the gearbox housing 12. The planet carrier 20 is provided with a second sprocket 44 arranged for connecting the planet carrier 20 with the gearbox housing 12 by means of the first coupling sleeve 42. The displacement of the respective clutch sleeve 42, 43 is performed when the input and the output shaft 16, 28 are stationary, which corresponds to a stationary operating state of the vehicle 1, when the range gearbox 15B is included in the transmission 3 of a vehicle 1. In order to provide a stationary position of the input shaft 16, the clutch 11 of the vehicle 1 is transferred to a disconnected mode. When the range gearbox 15B is operated in the third gear position, the torque is transmitted from the input shaft 16 to the sun gear wheel 18 and further to the planet gear wheels 24, which transmits the torque to the ring gear wheel 22 and further to the output shaft 28 via the second coupling sleeve 43. The planet carrier 20 is stationary as the first coupling sleeve 42 connects the planet carrier 20 with the gearbox housing 12.

With the gear ratio mentioned above, the range gearbox 15B may have a limited diameter and still the driveability of the vehicle 1 in the reverse direction is not adversely affected. A limited diameter of the range gearbox 15B will bring the overall components in the gearbox 2 to a minimum, and thus manufacturing and repair costs will be saved. The sun gear wheel 18 in the planetary gear 14 may be provided with a diameter, which withstands the considerable amount of torque needed. Thus, there is no need to increase the gear ratio of the planetary gear 14 in the range gearbox 15B by minimizing the diameter of the sun gear wheel 18.

An electronic control unit 70 is coupled to the powertrain 3 to achieve the gear shifting above. A number of (not shown) speed sensors in the powertrain 3 may be connected to the control unit 70. Another computer 72 may also be connected to the control unit 70. The control unit 70 may be a computer with appropriate software for this purpose. The control unit 70 and/or the computer 72 comprise a computer program P, which can include routines to control the gearbox 2 of the present invention. The program P may be stored in an executable form or compressed form in a memory M and/or in a read/write memory. Preferably, there is provided a computer program product comprising a program code stored on a computer readable medium for performing the gear shifting above, when the program is run on the control unit 70 or another computer 72 connected to the control unit 70. The code may be stored in the computer readable medium in a non-volatile manner.

The components and features specified above may within the framework of the invention be combined between the different embodiments specified.

The invention claimed is:

1. A gearbox for a vehicle, the gearbox comprising:
a split gearbox,
a main gearbox and
a range gearbox, which is shiftable into a low range gear position and a high range gear position;
the range gearbox comprises:
a planetary gear with a ring gear wheel, a sun gear wheel and a planet carrier, on which at least one planet gear wheel is rotatably mounted, the ring gear wheel and sun gear wheel engage with the at least one planet gear wheel;
a gearbox housing surrounding the planetary gear;
a first axially movable coupling sleeve arranged to engage the planet carrier with the gearbox housing; and
a second axially movable coupling sleeve arranged to engage the ring gear wheel with an output shaft to shift into a reverse gear in the gearbox,
wherein a crawler gear in the main gearbox is arranged to transfer torque through the gearbox when the range gearbox is shifted into the reverse gear so as to make the vehicle drive in a reverse direction.

2. The gearbox according to claim 1, wherein the gear ratio of the crawler gear is in the range 3.1:1-3.9:1.

3. The gearbox according to claim 1, wherein the gear ratio of the crawler gear is in the range 3.4:1-3.6:1.

4. The gearbox according to claim 1, wherein the crawler gear is only engaged when the gearbox is shifted into the reverse gear and in the forward direction when the range gearbox is shifted into the low range position.

5. The gearbox according to claim 1, wherein the planetary gear is arranged to have a gear ratio in the range 3.1:1-3.9:1 when shifted into the reverse gear.

6. The gearbox according to claim 1, wherein the planetary gear is arranged to have a gear ratio in the range 3.3:1-3.7:1 when shifted into the reverse gear.

7. The gearbox according to claim 1, wherein the split gearbox and the main gearbox are together arranged to have a largest combined gear ratio which is larger than the gear ratio in the planetary gear in the range gearbox when shifted into the reverse gear.

8. The gearbox according to claim 1, wherein the width of a crawler gear wheel of the crawler gear is smaller than the width of a gear wheel in a gear in the main gearbox having the second largest gear ratio.

9. The gearbox according to claim 8, wherein one crawler gear wheel of the crawler gear is arranged on a mainshaft in the main gearbox and the another crawler gear wheel of the crawler gear is arranged on a layshaft.

10. The gearbox according to claim 8, wherein one crawler gear wheel of the crawler gear is arranged on an input shaft in the split gearbox and the another crawler gear wheel of the crawler gear is arranged on a layshaft.

11. The gearbox according to claim 1, wherein the gearbox is arranged to have an overlapping gear ratio in at least the highest gear in the low range gear position and at least the lowest gear in a high range gear position.

12. The gearbox according to claim 11, wherein the gearbox is arranged to have an overlapping gear ratio in the two highest gears in the low range gear position and the two lowest gears in a high range gear position.

13. A vehicle, wherein the vehicle is provided with a gearbox according to claim 1.

* * * * *